United States Patent
Darrer et al.

(10) Patent No.: US 10,000,098 B2
(45) Date of Patent: Jun. 19, 2018

(54) TIRE PRESSURE MEASUREMENT DEVICE, AN INTEGRATED CIRCUIT, A PRINTED CIRCUIT BOARD, A METHOD AND A COMPUTER PROGRAM FOR A VEHICLE TO RECEIVE DATA

(71) Applicant: Infineon Technologies AG, Neubiberg (DE)

(72) Inventors: Franz Michael Darrer, Graz (AT); Walter Schuchter, Graz (AT)

(73) Assignee: Infineon Technologies AG, Neubiberg (DE)

( * ) Notice: Subject to any disclaimer, the term of this patent is extended or adjusted under 35 U.S.C. 154(b) by 0 days. days.

(21) Appl. No.: 15/358,273

(22) Filed: Nov. 22, 2016

(65) Prior Publication Data

US 2017/0144495 A1 May 25, 2017

(30) Foreign Application Priority Data

Nov. 25, 2015 (DE) .................. 10 2015 120 453

(51) Int. Cl.
*B60C 23/00* (2006.01)
*B60C 23/04* (2006.01)

(52) U.S. Cl.
CPC ........ *B60C 23/0433* (2013.01); *B60C 23/044* (2013.01); *B60C 23/0461* (2013.01)

(58) Field of Classification Search
None
See application file for complete search history.

(56) References Cited

U.S. PATENT DOCUMENTS

| | | | |
|---|---|---|---|
| 2002/0130765 A1* | 9/2002 | Flick | B60R 25/04 340/7.2 |
| 2006/0186996 A1* | 8/2006 | Sato | B60R 25/24 340/10.2 |
| 2013/0166166 A1 | 6/2013 | Steiner et al. | |
| 2014/0195104 A1 | 7/2014 | Hammerschmidt | |
| 2014/0266661 A1 | 9/2014 | Denlau et al. | |
| 2014/0292505 A1 | 10/2014 | McIntyre et al. | |
| 2014/0368326 A1 | 12/2014 | Vassilieff et al. | |
| 2014/0368327 A1 | 12/2014 | Darrer et al. | |
| 2014/0372006 A1 | 12/2014 | Hammerschmidt | |

(Continued)

FOREIGN PATENT DOCUMENTS

| | | |
|---|---|---|
| CN | 103171378 A | 6/2013 |
| CN | 104228489 A | 12/2014 |

(Continued)

*Primary Examiner* — Julie Lieu
(74) *Attorney, Agent, or Firm* — Volpe and Koenig, P.C.

(57) ABSTRACT

Embodiments provide a tire pressure measurement device, an integrated circuit, a printed circuit board, a method and a computer program to receive data. The tire pressure measurement device includes a first receiver configured to receive a low frequency signal using a first low frequency input of the first receiver, and a second input configured to receive a receive signal associated with a second receiver that is different from the first receiver. The tire pressure measurement device further includes a controller configured to control the first low frequency input of the first receiver and to couple the second input to the first low frequency input of the first receiver in order for the first receiver to receive the receive signal at the first low frequency input.

19 Claims, 5 Drawing Sheets

(56) References Cited

U.S. PATENT DOCUMENTS

2015/0019165 A1   1/2015  Theuss et al.
2016/0275732 A1*  9/2016  Tomita ............... G07C 9/00182
2017/0120865 A1*  5/2017  Li ....................... B60R 25/2036

FOREIGN PATENT DOCUMENTS

DE    10 2014 106 128 A1    12/2014
DE    10 2014 108 788 A1     1/2015

\* cited by examiner

TIRE PRESSURE MEASUREMENT DEVICE, AN INTEGRATED CIRCUIT, A PRINTED CIRCUIT BOARD, A METHOD AND A COMPUTER PROGRAM FOR A VEHICLE TO RECEIVE DATA

FIELD

Embodiments relate to a tire pressure measurement device, an integrated circuit, a printed circuit board, a method and a computer program for a vehicle to receive data.

BACKGROUND

Wheel units are electronic devices, which are used to monitor wheel properties or parameters. For example, monitoring a tire pressure has become part of governmental regulations in many countries, such that tires or wheels of vehicles are equipped with tire pressure measurement devices, which communicate signals indicative of a tire pressure to a control unit or controller of the vehicle. For example, tire pressure values can be determine and displayed to a user of the vehicle, warning indications can be generated if the tire pressure decreases below a critical threshold.

During manufacturing, production and service of the vehicles, wheels or tires, there may be a desire to communicate with wheel units, for example, for programming, configuration, set up, or security purposes. For example, a wheel unit of a Tire Pressure Monitoring System (TPMS) may have a need of a possibility to receive data during production or service. Today, a means to transfer data is electromagnetic radiation at 125 kHz, which is also referred to as Low Frequency (LF) communication. For example, production lines and service facilities are equipped with 125 kHz electromagnetic data transmitters. The wheel units are equipped with corresponding LF-receive antennas or coils, LF-receivers, respectively. In general the wheel units may transmit and receive data.

For example, data transmission, from the perspective of the wheel unit, may be done via a Radio Frequency (RF) transmitter in an Industrial, Scientific, and Medical (ISM)-band like 315 MHz or 434 MHz. Moreover, an active circuitry of the RF transmitter may be integrated on chip and an external RF antenna circuitry may comprise antenna matching, usually made of capacitors and inductors, and an RF antenna, which can be printed on a Printed Circuit Board (PCB) or be implemented using thick wires or even a metal bar. E.g. data reception, from the perspective of the wheel unit, may be done via an LF-receiver at 125 kHz.

SUMMARY

Embodiments provide a tire pressure measurement device, an integrated circuit, a printed circuit board, a method and a computer program to receive data. Embodiments enable a utilization of an LF receiver with a signal received by another receiver of a tire pressure measurement device. On chip there may be a low-power LF receiver (LFRX) with elaborate analog properties and signal processing capabilities like wake-up on carrier detection and identity (ID)-matching and autonomous data reception. External to the LFRX, circuitry may comprise one or more electronic elements like switches etc. and embodiments may enable to omit an LF coil or to use alternative communication to obtain or receive an LF receive signal. An LF coil does contribute to the physical dimensions, the weight and the price of the wheel unit, which may be eased or improved by embodiments. Alternative communication may enable a higher flexibility when communicating with a tire pressure measurement device. Embodiments may be enabled to receive data using an LFRX interface, for example, via an RF antenna circuitry or via an electromechanical transducer instead of via the LF coil.

Embodiments provide a tire pressure measurement device for a vehicle to receive data. The device comprises a first receiver to receive a low frequency signal using a first low frequency input of the first receiver and a second input for a receive signal of a second receiver being different from the first receiver. The device further comprises a controller to control the input of the first receiver and to couple the second input for the receive signal to the first low frequency input of the first receiver. Embodiments may allow using a second receiver to receive an LF input signal for an LF-receiver.

In embodiments the second input may be configured to receive the receive signal using a frequency band outside a low frequency band used by the first receiver. Embodiments may enable communication in a different frequency band to obtain the LF input signal. The second input may be configured to receive a radio frequency receive signal and the controller may be configured to convert the radio frequency receive signal into the low frequency receive signal, which is then coupled to the first low frequency input of the first receiver. Embodiments may convert radio signals from other frequency bands into an LF signal as input for the LF-receiver. The controller may comprise a demodulator configured to demodulate the radio frequency receive signal into the low frequency receive signal. For example, the demodulator may comprise at least one non-linear electronic component, such as at least one diode. Embodiments may provide an efficient implementation for converting or demodulating an RF signal into an LF signal.

In some embodiments the demodulator may be configured to demodulate an Amplitude Modulated (AM) or an Amplitude-Shift-Keying (ASK)-modulated radio frequency receive signal into the low frequency receive signal. Embodiments may enable efficient communication using amplitude modulation. For example, the tire pressure measurement device may further comprise the second receiver, a matching network for the second receiver and/or a radio frequency antenna.

In some embodiments the second input is configured to receive the receive signal being based on an acoustic receive signal. Embodiments may enable acoustic communication with the tire pressure measurement device. The tire pressure measurement device may further comprise an acoustical transducer to receive the acoustical receive signal and the transducer may be configured to convert sound applied to the tire into an electrical signal as receive signal. Embodiments may enable acoustic communication from outside the tire to the inside of the tire. The controller may be configured to couple the electrical signal to the input of the first receiver. In some embodiments the transducer may be configured to convert mechanical energy from tire deformation into electrical energy for powering the tire pressure measurement device. Embodiments may enable synergy effects by re-using a transducer for energy harvesting also for communicating. In even further embodiments the transducer may be further configured to carry out sound measurements. Embodiments may re-use a transducer for measurements, such as tread depth measurements or water contact measurements and enable another or a further synergy effect.

In some embodiments the controller may be configured to couple and to decouple the second input with the first low frequency input. Embodiments may use the second input for different purposes, e.g. for communicating using different frequencies or media. The controller may be configured to switch the second input between the first input of the first receiver and at least one other signal. Embodiments may enable to couple the second input with different other components and use the second receiver for different purposes, e.g. other communication, measurements, data transmission, etc.

The tire pressure measurement device may comprise a low frequency coil and the controller may be configured to couple the low frequency coil to the first input of the first receiver. Therewith the tire pressure measurement device may provide different options for receiving the LF receive signal, e.g. using RF, using sound, or using LF with a coil. Embodiments may hence provide multiple implementation options.

Embodiments further provide an integrated circuit comprising a tire pressure measurement device according to the above description. Embodiments further provide a printed circuit board comprising the integrated circuit.

Embodiments further provide a method for receiving data at a tire pressure measurement device for a vehicle. The method comprises controlling an input of a first receiver for a low frequency signal, and providing a receive signal from a second receiver, which is different from the first receiver. The method further comprises coupling the receive signal to the input of the first receiver.

Embodiments further provide a computer program product comprising a computer readable medium having computer readable program code embodied therein, the computer readable program code being configured to implement at least one of or a combination of the above-described methods, when being loaded on a computer, a processor, or a programmable hardware component.

Embodiments further provide a tire, a TPMS, or a vehicle with an embodiment of a tire pressure measurement device as described above.

BRIEF DESCRIPTION OF THE DRAWINGS

Some other features or aspects will be described using the following non-limiting embodiments of apparatuses and/or methods and/or computer programs by way of example only, and with reference to the accompanying figures, in which.

DETAILED DESCRIPTION

In the following some components will be shown in multiple figures, where consistent reference signs refer to functionally identical or similar components. Repetitive descriptions may be avoided for simplicity purposes. Features or components depicted in dotted lines are optional.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the invention. Like numbers refer to like or similar elements throughout the description of the figures.

As used herein, the term, "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Similarly, words such as "between", "adjacent", and the like should be interpreted in a like fashion.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements or components, but do not preclude the presence or addition of one or more other features, integers, steps, operations, elements, components or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Figure 1:
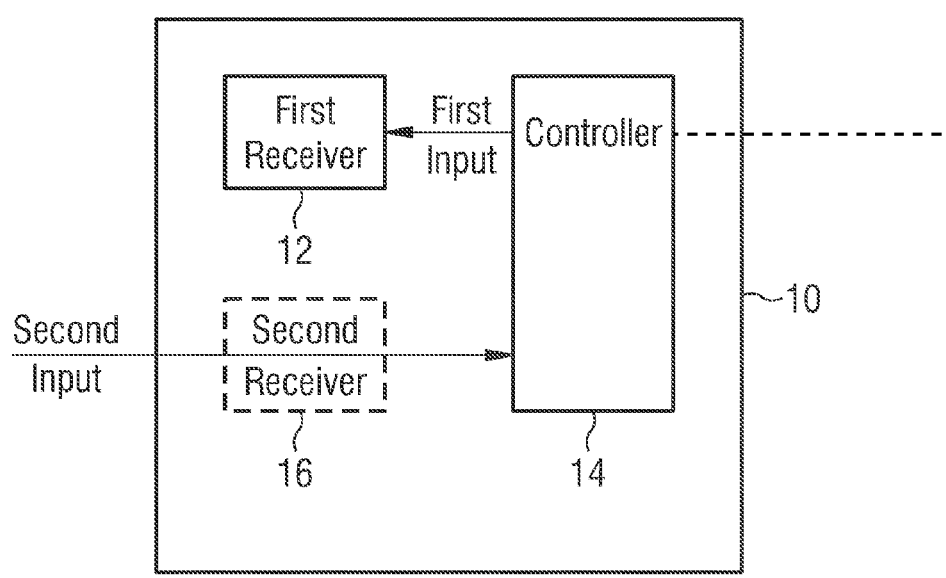
FIG. 1 shows a block diagram of an embodiment of a tire pressure measurement device.

FIG. 1 shows an embodiment of a tire pressure measurement device 10 of a tire for a vehicle to receive data. In the following a vehicle may comprise one or more tires or wheels, and a vehicle can be any vehicle using tires, as, for example, a car, a van, a truck, a bus, a plane, a bike, a motorbike, etc. Although, some embodiments may be exemplified using a car, any other vehicles can be utilized in embodiments. As shown in FIG. 1 the tire pressure measurement device comprises a first receiver 12 to receive a low frequency signal using a first low frequency input of the first receiver.

Here and in the following an input may be a contact or an interface to conduct a signal or information to the respective component. Such information or signal may be digital or analog. Hence an input may be implemented using one or more wires, circuit paths, conductors, etc. If multiple signal or information components are to be input, such input may be carried in a serial or in a parallel manner.

The first receiver 12, may be implemented as any means for receiving, or transceiving, i.e., receiving or transmitting or both, one or more receiver, transmitter or transceiver units, one or more receiver, transmitter or transceiver devices and it may comprise typical receiver, transmitter and/or transceiver components, such as one or more elements of the group of one or more Low-Noise Amplifiers (LNAs), one or more Power Amplifiers (PAs), one or more filters or filter circuitry, one or more diplexers, one or more duplexers, one or more Analog-to-Digital converters (A/D), one or more Digital-to-Analog converters (D/A), one or more modulators or demodulators, one or more mixers, one or more antennas, one or more coils, etc. LF may represent radio frequencies in the range of 30 kHz-300 kHz, with wavelength ranges from one to ten kilometers. As will be detailed subsequently, in some embodiments, the frequency may correspond to 125 kHz. As further shown in FIG. 1 the tire pressure measurement device 10 further comprises a second input for a receive signal of a second receiver 16 being different from the first receiver 12. The second receiver 16 may be internal or external to the tire pressure measurement device 10, internal or external to a substrate the tire pressure measurement device 10 is implemented on, respectively, as will be detailed in the embodiments described in the sequel. In the embodiment depicted in FIG. 1 the second receiver 16 is shown in broken lines to indicate it is optional in this embodiment.

The second receiver 16 may be implemented using similar components as described above for the first receiver 12, however, there are also other embodiments which use different communication media for the second receiver 16. In the following embodiments will be detailed, which use an RF-receiver 16a as an implementation for the second receiver 16. Other embodiments described in the sequel use an electromechanic transducer 16b as second receiver 16. The tire pressure measurement device 10 further comprises a controller 14 to control the input of the first receiver 12 and to couple the second input for the receive signal to the first low frequency input of the first receiver 12. As shown in the drawing, the controller 14 is coupled to the first receiver 12 via the first input. In embodiments, the controller 14 may be implemented using electronic components, such a non-linear components, analog and/or digital components, one or more processing units, one or more processing devices, any means for processing, such as a processor, a computer or a programmable hardware component being operable with accordingly adapted software. In other words, the described functions of the controller 14 may as well be implemented in software, which is then executed on one or more programmable hardware components. Such hardware components may comprise a general purpose processor, a Digital Signal Processor (DSP), a micro-controller, a Field Programmable Gate Array (FPGA), a Programmable Logic Device, a Programmable Array Logic (PAL) etc. In embodiments, the controller 14 may also be implemented using one or more Application Specific Integrated Circuits (ASIC). As indicated by the broken line, in embodiments the controller 14 may have further inputs and/or outputs.

In the following further embodiments will be described, which can, for example, make use of an on-chip LFRX 12 interface (first input) but may enhance a wheel module (tire pressure measurement device 10) so that it can receive data instead by means of the second receiver 16. In embodiments the LFRX may be used, for example, as wake-up source, to receive commands, for end-of-line test purposes, as bootloader, for programming or re-programming, etc.

Figure 2:
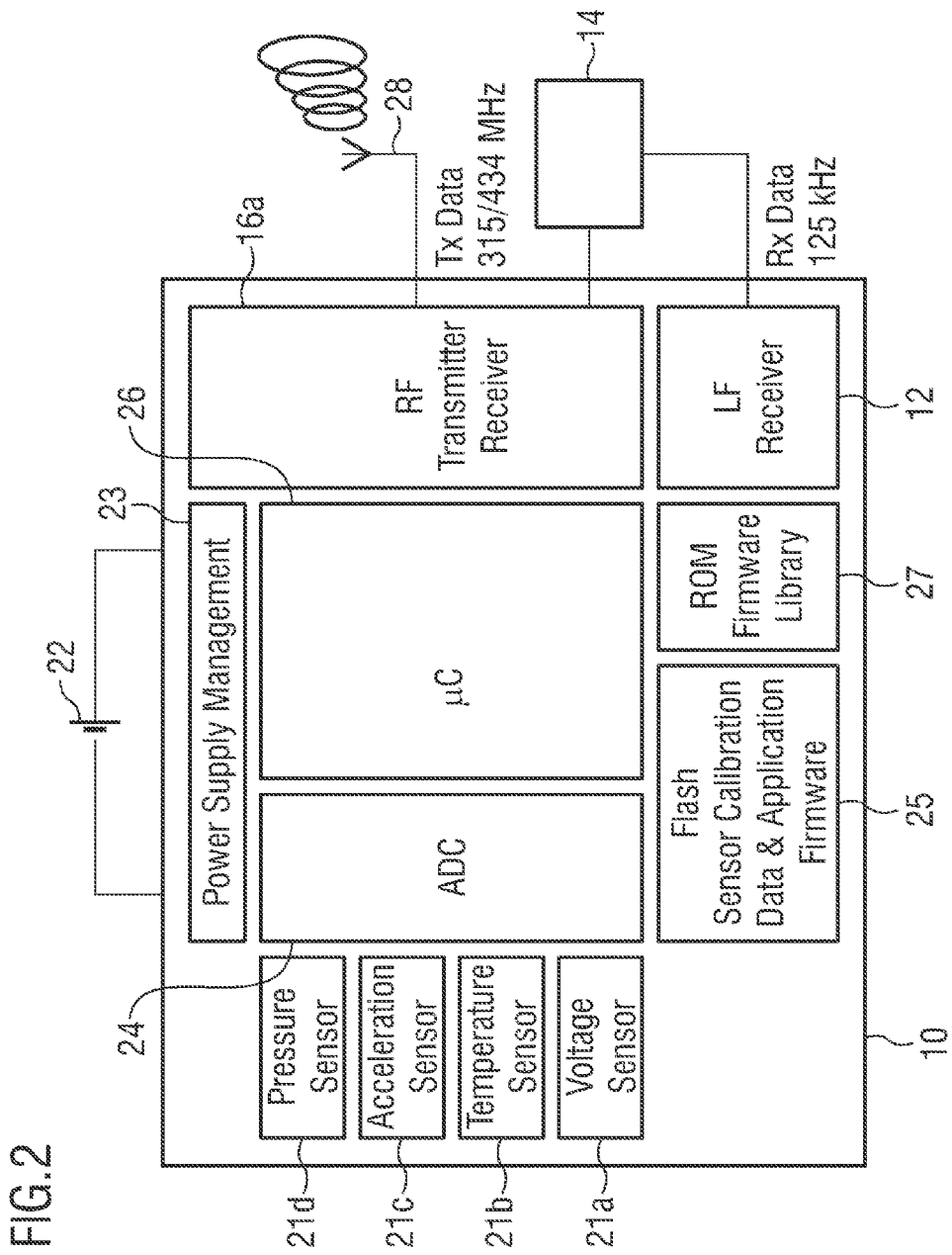
FIG. 2 illustrates a block diagram of an implementation of an embodiment of a tire pressure measurement device.

In another embodiment as shown in FIG. 1 the second input is configured to receive the receive signal using a frequency band outside a low frequency band used by the first receiver 12. FIG. 2 illustrates a block diagram of an implementation of an embodiment of a tire pressure measurement device 10. The tire pressure measurement device 10 comprises multiple sensors: a voltage sensor 21a, a temperature sensor 21b, an acceleration sensor 21c, and a pressure sensor 21d. A battery 22 powers the device 10 through power supply management 23. The tire pressure measurement device 10 further comprises an Analog/Digital-Converter 24 and a flash sensor calibration, data and application firmware 25, respectively. A microcontroller 26 is arranged in the center, which may comprise the controller 14, the controller 14 may as well be implemented as a separate block as shown in FIG. 2. The tire pressure measurement device 10 further comprises a Read Only Memory (ROM) firmware library 27 and an RF transmitter which in the present embodiment also comprises the second receiver 16, implemented as an RF receiver 16a. The RF transmitter may, for example, be configured to transmit tire pressure information and/or tire tread depth information to a receiver of the vehicle (e.g. as part of an Electronic Control Unit (ECU)).

The tire pressure measurement device 10 also comprises the LF receiver 12, which is configured to receive data using an LF signal at 125 kHz and which is coupled to the controller 14.

In the embodiment shown in FIG. 2 the second input of the controller 14 is configured to receive a radio frequency receive signal from the second receiver 16a. The controller 14 is configured to convert the radio frequency receive signal into the low frequency receive signal, which is then coupled to the first low frequency input of the first receiver 12. The conversion of the RF-signal allows re-using RF communication to receive data. Moreover, in a further embodiment the controller 14 comprises a demodulator configured to demodulate the radio frequency receive signal into the low frequency receive signal. Such an implementation may be very efficient, as a large LF receiver coil may be replaced by a rather small diode. The overall weight, size and price of the tire pressure measurement device 10 may be reduced. Thus, in some embodiments instead of receiving electromagnetic radiation at 125 kHz, RF antenna circuitry may be used and a demodulator. The demodulator may comprise at least one non-linear electronic component, for example, the at least one non-linear electronic component comprises at least one diode. The demodulator may be then be further configured to demodulate an Amplitude Modulated (AM), or an Amplitude-Shift-Keying (ASK) modulated radio frequency receive signal into the LF receive signal. As shown in FIG. 2 the tire pressure measurement device 10 in this embodiment comprises the second receiver 16a, a matching network for the second receiver 16a and a radio frequency antenna 28. Generally in embodiments the tire pressure measurement device 10 may comprise one or more of these components. Hence, embodiments may receive AM or ASK data coming in at ISM frequency.

Figure 3:
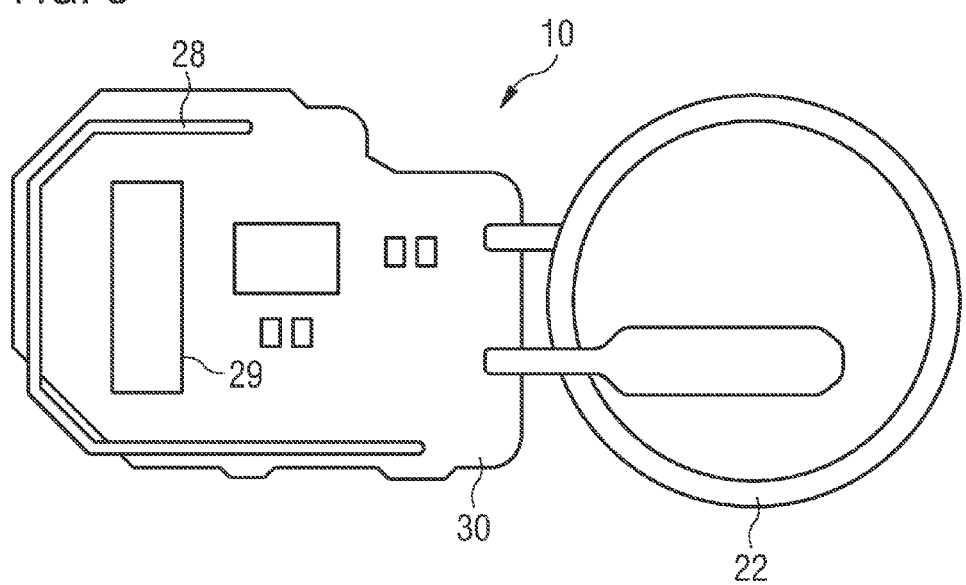
FIG. 3 illustrates an implementation of an embodiment with an LF coil.

FIG. 3 illustrates another implementation of an embodiment of a tire pressure measurement device 10. FIG. 3 shows a Printed Circuit Board 30 on which the components of the tire pressure measurement device 10 are mounted. Among these components there is an LF coil 29, which may still be implemented in some embodiments to allow for flexible communication using LF or RF. The embodiment of FIG. 3 further shows a battery 22 to power the tire pressure measurement device 10. FIG. 3 illustrates an RF antenna 28, which is implemented as wire placed on the PCB 30.

In yet another embodiment second input is configured to receive the receive signal being based on an acoustic receive signal. Such a signal may have, for example, a frequency or a bandwidth in the range of infrasound, audible sound up to ultrasound. While microphones and loudspeakers are known to be able to conduct such signal conversions, certain materials, for example, piezoelectric devices or crystals, may also be used as transducer 16b implementing the second receiver 16 to receive the acoustical receive signal. Ultrasonic, sonar, or magnetic sensors may be used to form a transducer 16b, e.g. a sound receiver, transmitter or transceiver (a combined receiver and transmitter). For example the transducer 16b may be configured to convert sound applied to the tire into an electrical signal as receive signal. The controller 14 is then configured to couple the electrical signal to the input of the first receiver 12. Still the converted signal is an electrical signal in the LF range, but received as an acoustical signal in this embodiment. More specifically, in an embodiment using sound communication, the received data may come in as sound at 125 kHz that is picked up by the electromechanic transducer 16b.

The transducer 16b may be configured to receive and/or generate acoustical signals, which may be an acoustical pulse, a waveform, a sequence of pulses or waveform, a chirp, a burst, an AM or ASK signal etc. The transducer 16b may comprise separate acoustical transmitter (to transmit an acoustical signal, for example, for measurement purposes) and receiver (to receive acoustical signals). So both options are conceivable for the transducer 16b in general: separate modules for acoustical transmission and reception or a single module (e.g. a single membrane, or crystal or piezoelectric device).

Embodiments may allow to get rid of the LF coil when an ISM band data transmitter is used or when a 125 kHz ultrasound data transmitter is used instead of a 125 kHz electromagnetic data transmitter. Embodiments may still provide the possibility to use an LF coil for applications where neither an ISM data transmitter nor a 125 kHz ultrasound data transmitter is available. Hence, embodiments may enable more universal or flexible communication means for a tire pressure measurement device 10, for example, being capable of receiving data via RF, LF and/or sound communication.

In embodiments the transducer 16b may be further configured to convert mechanical energy from tire deformation into electrical energy for powering the tire pressure measurement device 10. In some embodiments the transducer 16b from an energy harvester may be re-used. The transducer 16b may be further used for other purposes. For example, the transducer 16b may additionally or alternatively be configured to carry out sound measurements, such as tread depth measurements, water contact detection, etc.

In yet another embodiment the controller 14 is configured to couple and to decouple the second input with the first low frequency input. Hence, depending on a current purpose of the second receiver 16 (signal transmission or reception, measurements, energy harvesting, etc.), the controller 14 may switch or couple the inputs differently. For example, the controller 14 may be configured to switch the second input between the first input of the first receiver 12 and at least one other signal.

Figure 4:
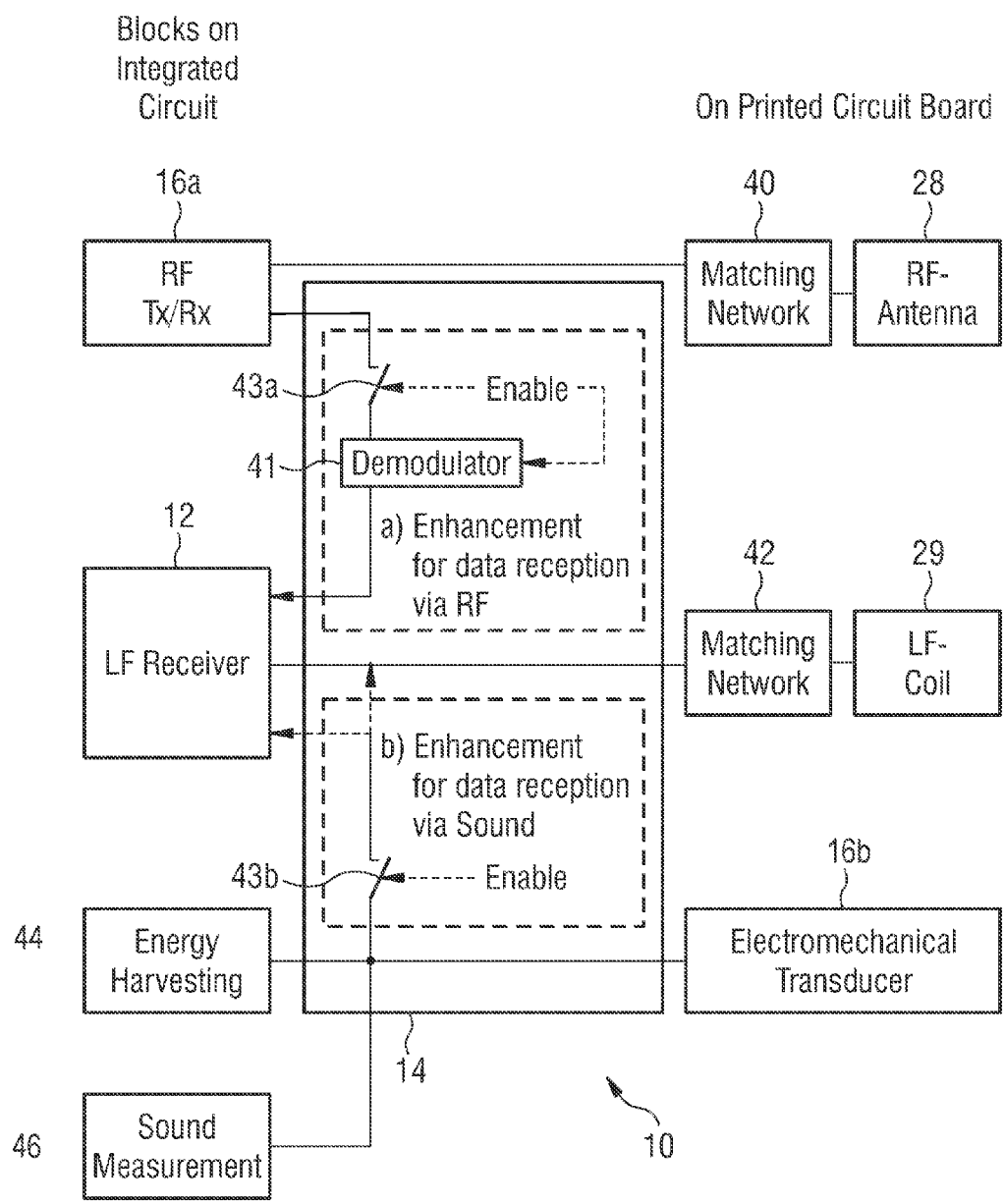
FIG. 4 depicts a block diagram of another embodiment.

FIG. 4 illustrates another embodiment, which has more universal or flexible communication properties. The embodiment depicted in FIG. 4 comprises multiple components, some of which are comprised in the same integrated circuit or chip (shown on the left hand side of FIG. 4) and some of which are implemented on the PCB. FIG. 4 shows an RF transmitter/receiver (Tx/Rx) 16a at the top left, which is coupled to an RF-antenna 28 through matching network 40. In this embodiment RF transmitter and receiver are implemented together in one block 16a. In other embodiments they may be implemented as separate blocks. The tire pressure measurement device 10 comprises the LF receiver 12 according to the above description. The controller 14 comprises a demodulator 41, which is coupled to the RF Tx/Rx 16a. For example the output of the RF matching network 40 may be looped through the RF-Tx/Rx 16a to the input of the controller 14 and transmitter components may be switched off during reception. The controller 14 further comprises a switch 43a to couple and to decouple the output from the RF Tx/Rx 16a with the first input of the LF receiver 12 via the demodulator 41. In another embodiment the controller 14 may be coupled with the output of the matching network 40. The second receiver 16 may then correspond to said coupling, said coupling and matching network 40 and/or RF antenna 28, respectively. The second receiver 16 may optionally comprise further components, such as filter circuitry, LNA, etc.

The input of the LF-receiver 12 may also be coupled to an LF coil 29 via another matching network 42, to still provide the option of communicating using LF electromagnetic signals. The embodiment of FIG. 4 further shows an electromechanical transducer 16b, which is coupled to the controller 14 and an energy harvesting circuit 44 as well as a sound measurement circuit 46 on the chip. The controller 14 further comprises a switch 43b to control the coupling of an output of the transducer 16b with the LF-receiver 12 according to the above. In some embodiments, the tire pressure measurement device 10 further comprises a low frequency coil 29, and the controller 14 may then be configured to couple the low frequency coil 29 to the first input of the first receiver 12. That is to say, in further embodiments the controller 14 may comprise a third switch to control the coupling of the LF-coil 29, a selector switch to switch the first input to the different circuits or components, respectively. As can be seen from FIG. 4, in this embodiment the controller 14 has multiple inputs, one for an RF signal from the RF Tx/Rx 16a, one from the electromechanical transducer 16b, and one from the matching network 42 of the LF-coil 29.

In more detail, an embodiment may pick up an electromagnetic signal using the RF antenna 28. The signal is impedance-matched and frequency-filtered by a matching network 40, so frequency components around the RF transmit frequency arrive at the demodulator 41 of the controller 14. The demodulator 41 can be placed on the integrated circuit or it can be placed on the PCB. The demodulator 41 can be implemented in a very simple way: A nonlinear device like a diode biased with a small DC (Direct Current) current, e.g. 100 nA, directly converts the AM or ASK content of the RF signal into baseband. This signal is coupled into the LF Receiver 12 and further processed there. Optionally, the demodulator 41 can be deactivated or disconnected from the RF Transmitter 16a when not needed or during an RF transmission.

The electromechanical transducer 16b converts sound applied to the tire into an electrical signal. This signal is coupled into the LF receiver 12 and further processed there. The signal can be fed into a dedicated input of the LFRX 12 or into an input otherwise used for connecting to the LF-Coil 29. The controller 14 may comprise a switch or coupler, which can be placed on the integrated circuit or it can be placed on the PCB. Optionally, the controller 14 may disconnect the LF receiver 12 from the electromechanical transducer 16b when/if not needed or during energy harvesting or when/if sound/acoustic measurements like tread depth measurements are performed. Embodiments may enable data reception in a configurable manner, e.g. via any physical data carrier like electromagnetic via LF or via RF, and/or via sound. Signal processing and data decoding may then be done via an on-chip LF receiver 12.

Embodiments may enable additional features for a tire pressure measurement device 10, that may provide added value for an end-user, like tire identification, mileage counter, tread depth measurement, water detection etc. Embodiments may be surface-mounted on a PCB assembled in wheel-unit or in-tire unit application housing. The tire pressure measurement device 10 may be supplied by a small battery 22, additionally or alternatively using an energy harvester (possible using the same transducer 16b).

Another embodiment is an integrated circuit comprising the tire pressure measurement device 10 according to the above description. Another embodiment is a printed circuit board comprising an embodiment of the integrated circuit.

Figure 5:
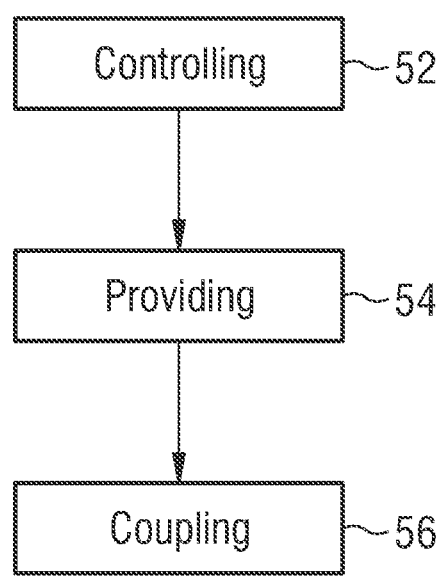
FIG. 5 shows a flow chart of an embodiment of a method for receiving data at a tire pressure measurement device.

FIG. 5 shows a flow chart of an embodiment of a method for receiving data at a tire pressure measurement device 10 for a vehicle. The method comprises controlling 52 an input of a first receiver 12 for a low frequency signal. The method further comprises providing 54 a receive signal from a second receiver, which is different from the first receiver. The method further comprises coupling 56 the receive signal to the input of the first receiver.

Another embodiment is a computer program product comprising a computer readable medium having computer readable program code embodied therein, the computer readable program code being configured to implement one or more of the above described methods, when/if being loaded on a computer, a processor, or a programmable hardware component. Another embodiment is a computer program having a program code on a non-transitory media for performing, when/if the computer program is executed on a computer or on a processor, one of the above methods. A further embodiment is a computer readable storage medium storing instructions which, when/if executed by a computer, cause the computer to implement one of the methods described herein.

A person of skill in the art would readily recognize that steps of various above-described methods may be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as magnetic disks and magnetic tapes, hard drives, or optically readable digital data storage media. The embodiments are also intended to cover computers programmed to perform said steps of the above-described methods or (field) programmable logic arrays ((F)PLAs) or (field) programmable gate arrays ((F)PGAs), programmed to perform said steps of the above-described methods.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the Figures, including any functional blocks labeled as "means", may be provided through the use of dedicated hardware, such as "a processor", "a sensor", "a controller", "a transmitter", "a receiver" etc. as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the Detailed Description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective steps of these methods.

Further, it is to be understood that the disclosure of multiple steps or functions disclosed in the specification or claims may not be construed as to be within the specific order. Therefore, the disclosure of multiple steps or functions will not limit these to a particular order unless such steps or functions are not interchangeable for technical reasons.

Furthermore, in some embodiments a single step may include or may be broken into multiple substeps. Such substeps may be included and part of the disclosure of this single step unless explicitly excluded.

What is claimed is:

1. A tire pressure measurement device for receiving data, comprising:

a first receiver configured to receive a low frequency signal at a first low frequency input of the first receiver; and a second input configured to receive a receive signal associated with a second receiver that is different from the first receiver; and a controller configured to control the low frequency input of the first receiver and to couple the second input to the first low frequency input of the first receiver in order for the first receiver to receive the receive signal at the first low frequency input.

2. The tire pressure measurement device of claim 1, wherein the second input is configured to receive the receive signal in a frequency band outside a low frequency band used by the first receiver.

3. The tire pressure measurement device of claim 2, wherein:
the second input is configured to receive a radio frequency receive signal, and
the controller is configured to convert the radio frequency receive signal into a low frequency receive signal, and output the low frequency receive signal to the first low frequency input of the first receiver.

4. The tire pressure measurement device of claim 3, wherein the controller comprises a demodulator configured to demodulate the radio frequency receive signal into the low frequency receive signal.

5. The tire pressure measurement device of claim 4, wherein the demodulator comprises at least one non-linear electronic component.

6. The tire pressure measurement device of claim 5, wherein the at least one non-linear electronic component comprises at least one diode.

7. The tire pressure measurement device of claim 4, wherein the demodulator is configured to demodulate an Amplitude Modulated (AM) or an Amplitude-Shift-Keying (ASK)-modulated radio frequency receive signal into the low frequency receive signal.

8. The tire pressure measurement device of claim 1, further comprising:
at least one of the second receiver, a matching network for the second receiver, and a radio frequency antenna.

9. The tire pressure measurement device of claim 1, wherein the second input is configured to receive the receive signal that is based on an acoustical receive signal.

10. The tire pressure measurement device of claim 9, further comprising:

an acoustical transducer configured to receive the acoustical receive signal.

11. The tire pressure measurement device of claim 10, wherein the acoustical transducer is configured to convert sound applied to a tire into an electrical signal as the receive signal.

12. The tire pressure measurement device of claim 11, wherein the controller is configured to couple the electrical signal to the first low frequency input of the first receiver.

13. The tire pressure measurement device of claim 12, wherein the acoustical transducer is configured to convert mechanical energy from tire deformation into electrical energy for powering the tire pressure measurement device.

14. The tire pressure measurement device of claim 13, wherein the acoustical transducer is further configured to carry out sound measurements.

15. The tire pressure measurement device of claim 1, wherein the controller is configured to couple and to decouple the second input with the first low frequency input.

16. The tire pressure measurement device of claim 1, wherein the controller is configured to switch the second input between the first low frequency input of the first receiver and at least one other signal.

17. The tire pressure measurement device of claim 1, further comprising:
a low frequency coil, wherein the controller is configured to couple the low frequency coil to the first low frequency input of the first receiver.

18. A method for receiving data at a tire pressure measurement device, comprising:
controlling an input of a first receiver for receiving a low frequency signal;
providing a receive signal from a second receiver, which is different from the first receiver; and
coupling the receive signal to the input of the first receiver.

19. A non-transitory computer readable medium comprising a computer readable program code embodied therein, the computer readable program code being configured, when executed, to cause a computer program to implement a method for receiving data at a tire pressure measurement device, the method comprising:
controlling an input of a first receiver for receiving a low frequency signal;
providing a receive signal from a second receiver that is different from the first receiver; and
coupling the receive signal to the first receiver.

* * * * *